United States Patent Office 2,828,269
Patented Mar. 25, 1958

2,828,269

PROCESS FOR BREAKING PETROLEUM EMULSIONS

Melvin De Groote, University City, and Alvin Howard Smith, Glendale, Mo., assignors to Petrolite Corporation, Wilmington, Del., a corporation of Delaware No Drawing. Application August 3, 1955
Serial No. 526,331

27 Claims. (Cl. 252—339)

The present invention relates to processes or procedures particularly adapted for preventing, breaking, or resolving petroleum emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprises fine droplets of naturally-occurring waters or brines dispersed in a more or less permanent state thoughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The present invention is concerned with a process for breaking petroleum emulsions of the water-in-oil type characterized by subjecting the emulsion to the action of a demulsifying agent comprising a mixture of at least 60% by weight and not over 90% by weight of (A) a conventional aromatic solvent-soluble non-ionic demulsifier, and at least 10% by weight and not over 40% by weight of (B) ammonium salts obtained by mono sulfonation and neutralization of a sulfonatable mixture consisting of (a) nonyl phenol foots characterized by a dinonyl phenol to nonyl phenol ratio within the range of 2:1 to 3:1 and containing not less than 90% of nonylated phenols and (b) keryl benzene foots; the ratio of (a) to (b) being within the range of 2:1 to 4:1.

Keryl benzene is a product obtained from benzene and chlorinated kerosene fractions. Chlorinated kerosene fractions are obtained by treating a kerosene fraction of a Pennsylvania petroleum distillate or the like with chlorine so as to produce a mixture consisting principally of mono chlorinated hydrocarbons together with more highly chlorinated hydrocarbons and some unchlorinated hydrocarbons. The reaction products thus obtained are reacted with benzene in the presence of anhydrous aluminum chloride. The resulting products obtained are then subjected to sulfonation. See U. S. Patent No. 2,233,408, dated March 4, 1941, to Flett.

In the manufacture of keryl benzene sulphonates the alkylated benzene prior to sulphonation is frequently distilled so as to separate the mono alkylated from the poly alkylated material. The poly alkylated material represents the residual fraction, or bottoms, or foots. The amount of keryl benzene produced currently is not large. The alkyl groups contain more carbon atoms, of course, than dodecyl benzene. The amounts of foots or bottoms obtained in keryl benzene manufacture is obviously limited. We are not aware that any one has suggested the sulphonation of the foots as such and their use for demulsification or as a component of a demulsifying mixture. However, it is perfectly understandable that if sulphonation of a highly alkylated benzene (introduction of 18 or more carbon atoms into the benzene ring) yields sulphonic acids which either as such or in the form of the ammonium salts are oil soluble one would expect them to serve as substitutes for mahogany acid soaps. See what is said hereinafter in Part I. Aforementioned U. S. Patent 2,233,408 gives all the information required as to the sulphonation of keryl benzene or keryl benzene foots. Needless to say, for all practical effect it is the same as is used in connection with nonyl phenol foots. Stated another way the mixture of the two sulphonatable materials is susceptible to sulphonation in the manner applicable to either one or both.

The nonionic demulsifiers of the kind described are well known and numerous examples will be included subsequently. Nonyl phenol foots consisting largely of dinonyl phenol and sometimes referred to as dinonyl phenol crude or as nonyl phenol bottoms has been available only recently as a commercial product. The reason is as follows: Nonyl phenol is finding substantial use in the form of its ethylene oxide addition product as a synthetic detergent. The nonyl phenol used for this purpose is preferably colorless and free from dinonyl phenol. In the alkylation of phenol to produce the nonyl phenol there is invariably produced some dinonyl phenol. The nonyl phenol is removed by distillation. The residual product, referred to as nonyl phenol bottoms, nonyl phenol foots, or as crude dinonyl phenol, depending on its method of manufacture, may contain as much as 75% of dinonyl phenol and as little as 25% of nonyl phenol. A product obtained from another manufacturer contained approximately 65% dinonyl phenol and 35% nonyl phenol. Various samples contain the two phenols in amounts equivalent to 90–100% of the product. The commercially available product appears to contain little or no trinonyl phenol but may have some polymerized nonylene or the like. A typical example of commercially available product is characterized by the following:

Physical form_____ Viscous amber liquid.
Boiling point_____ 5% (760 mm.); over 325° C.
Hydroxyl number_____ 145–165.
Specific gravity_____ At 25°/25° C.: .90–.92.

For the above reason we are not aware whether sulfonated nonyl phenol foots have been described in the patent literature or elsewhere and for this reason there will be included a complete description of the mono sulfonation followed by conversion into the ammonium salt.

For convenience what is said hereinafter is divided into 5 parts:

Part I is concerned with the utilization of oil soluble sulfonates in demulsifying process;

Part II is concerned with the preparation of the sulfonate derivatives of the mixture of nonyl phenol foots and keryl benzene foots. The sulfonated mixture is considered as a single component as far as composition with the nonionic demulsifier is concerned;

Part III is a description of conventional aromatic solvent soluble nonionic demulsifiers used as one of the two components in the mixture which exemplifies the present process;

Part IV is concerned with suitable mixtures of the materials described in Part II and Part III preceding to yield the demulsifiers as herein employed;

Part V is concerned with the use of said demulsifiers for the resolution of petroleum emulsions of the water in oil type.

PART I

In our co-pending application Serial No. 526,329, filed August 3, 1955, the following text concerned with the use of sulfonates derived from nonyl phenol foots applies with equal force to the present mixture wherein the sulphonate employed is in reality derived not only from nonyl phenol foots but by the use of keryl foots in combination. The text of said co-pending application states:

"The use of sulfonates for resolution of petroleum emulsions is well known. See U. S. Patent 1,299,385, dated April 1, 1919, to Rogers. It is noted in said patent that it was concerned primarily with the use of sulfonates obtained from mineral oil. Over a period of years although a large number of petroleum sulfonates have been used in demulsification either as the sole component of the demulsifier or in admixture with other well known demulsifiers it has happened that for many years the overwhelming percentage of such material, probably more than 90% consumed as demulsifiers, happened to be oil soluble type or mahogany acid soap type.

For a number of years it has been recognized that although the composition of mahogany soaps might vary, and undoubtedly does vary, a better understanding of the oil solubility of hydrocarbon sulfonates is obtained by a study of alkylated aromatic sulfonates.

U. S. Patent 2,448,184, dated August 31, 1948, to Lemmon states:

"Sulfonated alkyl aromatic hydrocarbons have been widely used as wetting, washing, emulsifying and detergent agents. Depending upon the length of the alkyl chain of the alkyl substituent, the sulfonated alkyl aromatic hydrocarbons are either preferentially water-soluble or preferentially oil soluble. For example, alkyl benzene sulfonates in which the alkyl group contains from about 10 to about 15 carbon atoms are preferentially water-soluble and are useful as wetting and/or detergent agents. The higher alkyl benzene sulfonates, that is, alkyl benzene sulfonates containing more than 16 carbon atoms and usually from about 18 to about 30 carbon atoms in the alkyl groups, are preferentially oil-soluble. These preferentially oil-soluble alkyl aromatic sulfonates in many respects resemble the preferentially oil-soluble sulfonates obtained in the treatment of petroleum oils with concentrated or fuming sulfuric acid. These preferentially oil soluble petroleum sulfonates, because of their characteristic color are generally referred to as mahogany soaps although certain preferentially oil-soluble petroleum sulfonates having a characteristic brownish color are called brown acid soaps."

In light of the lack of specificity in regard to the composition of mahogany soaps and in regard to oil soluble sulfonates obtained by the sulfonation of alkylated aromatics, particularly alkylated benzene, then the introduction of 18 carbon atoms or more, a single side chain or more than one side chain, generally yields oil soluble sulfonates. Needless to say, in the case of a phenol if one introduces three alkyl radicals it might be more difficult to sulfonate than if the product were mono or disubstituted and thus tend towards the increased production of by-products.

For the above reason although as stated it is not known whether sulfonated nonyl phenol foots or bottoms have been described and also not withstanding the fact that the total number of carbon atoms in the side chain may be somewhat less than the normal borderline, i. e., about 15 carbon atoms instead of 18 and not withstanding the fact that the hydroxyl radical does contribute a hydrophile effect, even so no claim is made in regard to these herein described sulfonates alone as demulsifiers. Likewise no significance is attached to the above statement that the alkyl carbon atoms even where there are as many as 18 present are divided into two alkyl chains. Even so the invention is not concerned with the use of another oil soluble sulfonate as such but to its use in combination with the components of a demulsifying mixture described in Part III following. In such mixture as will be pointed out in Part IV following the effectiveness of the sulfonate is to be found largely in introducing an anti-sludging property in the sense that when demulsification does take place by means of a mixed demulsifier, a comparatively clean interface is obtained at the interface surface between the oil and water layer, or at least a bright transparent upper oil layer.

Keryl benzene foots available commercially have the following appearance:

A medium viscous liquid, very dark brown in color. Kerosene used in its manufacture averages about 13½ carbon atoms. Therefore, the foots probably run as a mixture of $C_{14}$ and di $C_{14}$.

Our procedure has been simply to mix nonyl phenol foots with ¼ its weight or ½ its weight of keryl benzene foots and subject the mixture to sulphonation in the same way that one would sulphonate either material separately.

PART II

As previously pointed out, the sulphonation of the mixed phenol foots-keryl benzene foots is conventional and one can use any one of a number of acceptable sulphonating agents such as sulphur trioxide, oleum, etc. The acidic mass is then neutralized with anhydrous ammonia of a commercial aqua ammonia. The following Examples 1a through 12a illustrate the procedure.

*Example 1a*

A 100 lb. charge consisting of 80% nonyl phenol foots and 20% keryl benzene still bottoms was placed in a conventional sulphonator. The phenol foots consisted of approximately 75% dinonyl and 25% nonyl phenol. For a description of a typical sulphonator, see "Unit Processes in Organic Synthesis," Groggins, 4th ed., McGraw-Hill, New York, 1952, page 266. The batch was agitated while 55 lb. of 25% oleum was run in. The oleum addition was controlled so as not to produce a temperature then cooled back to 40° C. Twenty eight pounds of water was added and the batch allowed to settle overnight. When the spent acid had been withdrawn, a yield of 123 pounds of sulphonic acid remained. This was diluted with an aromatic solvent in order to reduce the viscosity, and 28 pounds of ammonium hydroxide was added to neutralize the batch. More solvent was added so as to give a product containing 75% active sulphonate. The active ingredient contained about 13.5% combined $SO_3$ plus 1.5% free $SO_3$ and was completely soluble in such solvents as xylene, kerosene, and alcohol. Free $SO_3$ as described in these examples refers to $SO_3$ in the form of sulphuric acid.

*Example 2a*

In this example the crude nonyl phenol foots contained about 65% dinonyl phenol and 35% nonyl phenol. Eighty pounds of the phenols were mixed with 20 pounds of keryl benzene still residue. The sulphonator used was the same as described in Example 1a, preceding. The batch was sulphonated at 80° C. as before with 65 pounds of 25% oleum. After being washed with 35 pounds of water and settled overnight, the sulphonic acids were recovered by drawing off the spent acid. The yield was 128 pounds. Solvents were added, together with 30 pounds of ammonium hydroxide. The active sulphonate contained 14.5% combined $SO_3$ plus 1.5% free $SO_3$. The batch was adjusted to 75% active with solvent and appeared to have properties very similar to the sulphonate in Example 1a.

*Example 3a*

A mixture of crude phenol and keryl benzene residue was sulphonated exactly as in Example 2a, with identical amounts of reactants. The crude phenol consisted of 68% dinonyl phenol, 25% nonyl phenol, and 7% of non-phenolic matter. The non-phenols were assumed to be aromatic hydrocarbons and perhaps some polymerized nonenes. The keryl benzene residue was the same as used in Example 2a. The yield of sulphonic acid was 126 pounds. The active material contained 15% combined $SO_3$ plus 2% free $SO_3$. The ammonium sulphonates were soluble in xylene, kerosene, alcohol, and similar solvents. The sulphonate was adjusted to 75% of active material with an aromatic solvent.

*Example 4a*

The crude phenol-keryl benzene mixture of Example 1a was sulphonated with anhydrous sulfur trioxide. The reactor used was similar to the type described in British Patent 664,577 to Newby, January 9, 1952. One hundred pounds of mixture was held at 75° C. while 15.5 pounds of sulphur-trioxide gas was run in over a two-hour period. The $SO_3$ gas was diluted with 9 volumes of dry air. A yield of 115 pounds of sulphonic acids was obtained, containing 12.3% combined $SO_3$ and 0.7% free $SO_3$. Solvent was added in an amount such that a 75% active sulfonate remained after neutralization with 26.5 pounds of ammonium hydroxide. The product was slightly more viscous and darker than that of Example 1a, but otherwise substantially identical.

*Example 5a*

The crude mixture of Example 2a was used in this case. One hundred pounds was charged to the sulphonator together with 30 pounds of mineral spirits. The solvent was added merely to reduce viscosity and took no part in the sulphonation. Sixteen and one half pounds of gaseous $SO_3$ diluted with 9 volumes of dry air was admitted over a two-hour period. The yield was 116 pounds of sulphonic acids containing 13% combined $SO_3$ and 0.5% free $SO_3$. Twenty seven and eight tenths pounds of ammonium hydroxide was required for neutralization. Additional solvent was added to give a product containing 75% ammonium sulphonates.

*Example 6a*

The crude mixture of Example 3a was reacted with 16.5 pounds of $SO_3$ as described in Example 5a. The active sulphonic acids contained 13.4% combined $SO_3$ and 0.5% free $SO_3$. The batch was adjusted to 75% active and was similar in appearance to the product of Example 5a. The product was soluble in xylene, kerosene, and alcohol.

*Example 7a*

The procedure used in Example 1a was followed here. The batch consisted of two parts of this crude nonyl phenol and one part of the keryl benzene residue. The sulphonates contained 14% combined $SO_3$ and were somewhat less viscous than those of Example 1a.

*Example 8a*

Example 2a was repeated. The batch used consisted of two parts crude phenol to one part crude keryl benzene. The sulphonates contained 15% combined $SO_3$.

*Example 9a*

Example 3a was repeated. The batch used consisted of two parts crude phenol to one part crude keryl benzene. The sulphonates contained 15% combined $SO_3$.

*Example 10a*

Example 4a was repeated. The batch consisted of two parts crude phenol to one part crude keryl benzene. An additional one pound of $SO_3$ was used. The sulphonates contained 13% combined $SO_3$, and were somewhat less viscous than the sulphonates of Example 4a.

*Example 11a*

Example 5a was repeated. The batch consisted of two parts crude phenol to 1 part crude keryl benzene. An additional 1.5 pounds of $SO_3$ was used. The sulphonates contained 13.5% combined $SO_3$.

*Example 12a*

Example 6a was repeated. The batch consisted of two parts crude phenol to one part crude keryl benzene. An additional pound of $SO_3$ was used. The sulphonates contained 14% combined $SO_3$.

PART III

As previously stated the demulsifying agents employed in the present process are obtained by mixing ammonium sulfonates of the kind described elsewhere in this specification with conventional nonionic aromatic soluble demulsifiers. Conventional nonionic demulsifiers are obtained by a reaction with ethylene oxide, propylene oxide, butylene oxide and glycide. The initial reactant may be a water soluble product such as alcohol, alkylated phenol, an amide, acid, or the like. Such reactants may and usually do contain at least one radical having not less than 8 uninterrupted carbon atoms.

In some instances, however, one may start with water soluble substances, for instance low mole glycols such as ethylene glycol, propylene glycol, butylene glycol or low molecular weight polymers thereof or some other hydroxyated material such as pentaerythritol, sorbitol or the like. Such products are characterized by the fact that even after oxyalkylation there is not present any radical having as many as 8 uninterrupted carbon atoms. In such instances the manufacture of the conventional nonionic demulsifying agent invariably involves the use of either propylene oxide or butylene oxide or both along with either ethylene oxide or glycide or both. Some conventional nonionic demulsifiers may have free carboxyl radicals or may be obtained by linear polymerization between a low molal dicarboxy acid and an alkylene oxide derivative. The unneutralized carboxyl group does not introduce any measurable anionic surface active properties.

In some instances effective conventional demulsifying agents are made which are initially hydrophile in character comparable to ordinary household liquid detergent. They are insoluble in aromatic hydrocarbons which is understood to mean a non oxygenated hydrocarbon aromatic solvent such as benzene, toluene, xylene, high boiling solvent derived from coal tar, cracking of petroleum, hydrogenated coal, etc. A large number of conventional nonionic demulsifying agents are soluble in the aromatic solvent of the kind described. For example one can readily prepare a solution of 10 parts of such conventional demulsifier by weight and 100 parts of xylene by weight at ordinary or slightly elevated temperatures.

The present invention is limited to such aromatic solvent soluble nonionic demulsifiers.

Demulsifiers of the type referred to immediately preceding are described in a number of patents. See U. S. Patent No. 2,499,365, dated March 7, 1950, to De Groote and Keiser. Still another type are the kind described in U. S. Patent No. 2,562,878, dated August 7, 1951, to Blair.

Other types are obtained by the oxyethylation of polypropyleneglycols. See U. S. Patent No. 2,674,619, dated April 6, 1954, to Lundsted.

See also U. S. Patent No. 626,942, dated January 27, 1953 to De Groote; U. S. Patent No. 2,629,704, dated February 24, 1953, to De Groote et al.; U. S. Reissue Patent No. 23,851, dated July 13, 1954, to De Groote et al.; U. S. Patent No. 2,629,706, dated February 24, 1953, to De Groote et al.; U. S. 2,549,434, dated April 17, 1951, to De Groote et al.; U. S. 2,552,528, dated May 15, 1951, to De Groote; and U. S. 2,552,529, dated May 15, 1951, to De Groote.

Typical conventional nonionic aromatic solvent soluble demulsifiers are indicated in the following table:

TABLE I

| Example No. | Description of aromatic solvent soluble nonionic demulsifiers |
|---|---|
| 1b | See Example 18C in aforementioned U. S. Patent No. 2,626,942. |
| 2b | See Example 26C in aforementioned U. S. Patent No. 2,626,942. |
| 3b | See Example 43C in aforementioned U. S. Patent No. 2,626,942. |
| 4b | See demulsifier defined by claim 3 of aforementioned U. S. Patent No. 2,629,704. |
| 5b | See demulsifying agent defined by claim 5 of aforementioned U. S. Patent No. 2,629,704. |
| 6b | See demulsifying agent defined by claim 6 of aforementioned U. S. Patent No. 2,629,704. |
| 7b | See demulsifying agent defined by claim 3 of aforementioned Reissue Patent U. S. 23,851. |
| 8b | See demulsifying agent defined by claim 4 of aforementioned Reissue Patent U. S. 23,851. |
| 9b | See demulsifying agent defined by claim 5 of aforementioned Reissue Patent U. S. 23,851. |
| 10b | See demulsifying agent defined in claims 3, 4 and 5 of aforementioned U. S. Patent 2,629,706. |
| 11b | See demulsifying agent defined in claim 9 of aforementioned patent U. S. 2,562,878 and derived from polypropylene-glycol molecular weight, 2,000. |
| 12b | See demulsifying agent defined in claim 9 of aforementioned patent U. S. 2,562,878 and derived from polypropylene glycol molecular weight 2,250. |
| 13b | See demulsifying agent defined in claim 9 of aforementioned patent U. S. 2,562,878 and derived from polypropylene glycol molecular weight 2500. |
| 14b | See demulsifying agent defined in claim 9 of aforementioned patent U. S. 2,562,878 and derived from polypropylene glycol molecular weight 2,750. |
| 15b | See industrial pamphlet "Pluronics" of Wyandotte Chemical Corporation, Wyandotte, Michigan. Pluronic L—72. See also aforementioned U. S. Patent 2,674,619. |
| 16b | See industrial pamphlet "Pluronics" of Wyandotte Chemical Corporation, Wyandotte, Michigan. Pluronic L—62. See also aforementioned U. S. Patent 2,674,619. |
| 17b | See industrial pamphlet "Pluronics" of Wyandotte Chemical Corporation, Wyandotte, Michigan. Pluronic L—64. See also aforementioned U. S. Patent 2,674,619. |
| 18b | See industrial pamphlet "Pluronics" of Wyandotte Chemical Corporation, Wyandotte, Michigan. Pluronic L—31. See also aforementioned U. S. Patent 2,674,619. |
| 19b | See industrial pamphlet "Pluronics" of Wyandotte Chemical Corporation, Wyandotte, Michigan. Pluronic L—61. See also aforementioned U. S. Patent 2,674,619. |
| 20b | See industrial pamphlet "Pluronics" of Wyandotte Chemical Corporation, Wyandotte, Michigan. Pluronic L—81. See also aforementioned U. S. Patent 2,674,619. |
| 21b | See industrial pamphlet "Pluronics" of Wyandotte Chemical Corporation, Wyandotte, Michigan. Pluronic L—42. See also aforementioned U. S. Patent 2,674,619. |
| 22b | See industrial pamphlet "Pluronics" of Wyandotte Chemical Corporation, Wyandotte, Michigan. Pluronic L—33. See also aforementioned U. S. Patent 2,674,619. |
| 23b | See Example B in aforementioned U. S. Patent 2,549,434. Propylene oxide added first, then ethylene oxide. |
| 24b | See Example E in aforementioned U. S. Patent 2,549,434. Propylene oxide added first, then ethylene oxide. |
| 25b | See Example C in aforementioned U. S. Patent 2,549,434. Propylene oxide added first, then ethylene oxide. |
| 26b | See Example M of aforementioned U. S. Patent 2,552,529. Propylene added first, then ethylene oxide. |
| 27b | See Example 25 of aforementioned U. S. Patent 2,552,528. |

Note.—"Pluronics" is the trademark of Wyandotte Chemicals Corp., to identify products of the kind described in aforementioned U. S. Patent 2,674,619.

PART IV

Demulsifiers are ordinarily used in concentrations of approximately 50 to 80%. The purpose is to supply the demulsifier in the form of a liquid which can be employed by means of a metering pump or other measuring device. Since solvent is usually present in the final mixed product we have found it more convenient to make a solution of the ammonium sulfonate and the nonionic demulsifier separately in a high boiling aromatic solvent. Generally, a 65% to 75% solution is used. The two solutions are then mixed so as to give the desired ratio between the two components and have a suitable solvent present. More solvent can be added if desired. Hereto attached Table II illustrates a variety of suitable mixtures.

TABLE II.—MIXED DEMULSIFIER

[Ammonium sulfonates used is indicated by designation 1a, 2a, etc. in parentheses. The nonionic demulsifier used is indicated by the designation 1b, 2b, etc. outside the parentheses. The percentage by weight of ammonium sulfonates used is indicated at the head of the column and the remainder is nonionic demulsifier. Percentage by weight is on solvent free basis.]

| Ex. No. | 10% | 20% | 25% | 33.3% | 40% |
|---|---|---|---|---|---|
| 1c | 1b (1a) | ( ) | ( ) | ( ) | ( ) |
| 2c | 2b ( ) | (1a) | ( ) | ( ) | ( ) |
| 3c | 2b ( ) | (2a) | ( ) | ( ) | ( ) |
| 4c | 4b ( ) | ( ) | (3a) | ( ) | ( ) |
| 5c | 4b ( ) | ( ) | (6a) | ( ) | ( ) |
| 6c | 6b ( ) | ( ) | (4a) | ( ) | ( ) |
| 7c | 8c ( ) | (5a) | ( ) | ( ) | ( ) |
| 8c | 8b ( ) | (6a) | ( ) | ( ) | ( ) |
| 9c | 9b ( ) | (5a) | ( ) | ( ) | ( ) |
| 10c | 10b (4a) | ( ) | ( ) | ( ) | ( ) |
| 11c | 11b ( ) | (4a) | ( ) | ( ) | ( ) |
| 12c | 12b ( ) | (3a) | ( ) | ( ) | ( ) |
| 13c | 13b (2a) | ( ) | ( ) | ( ) | ( ) |
| 14c | 14b (1a) | ( ) | ( ) | ( ) | ( ) |
| 15c | 15b (2a) | ( ) | ( ) | ( ) | ( ) |
| 16c | 16b ( ) | (4a) | ( ) | ( ) | ( ) |
| 17c | 17b ( ) | ( ) | (5a) | ( ) | ( ) |
| 18c | 19b ( ) | (6a) | ( ) | ( ) | ( ) |
| 19c | 20b (1a) | ( ) | ( ) | ( ) | ( ) |
| 20c | 21b ( ) | ( ) | ( ) | ( ) | (4a) |
| 21c | 22b ( ) | ( ) | ( ) | ( ) | (5a) |
| 22c | 24b ( ) | ( ) | ( ) | (1a) | ( ) |
| 23c | 26b ( ) | ( ) | ( ) | (3a) | ( ) |
| 24c | 27b ( ) | ( ) | ( ) | ( ) | (2a) |

PART V

As to the use of conventional demulsifying agents, reference is made to U. S. Patent No. 2,626,929, dated January 27, 1953, to De Groote, and particularly to Part III. Everything that appears therein applies with equal force and effect to the instant process, noting only that where reference is made to Example 13b in said test beginning in column 15 and ending in column 18, reference should be to Example 18b, herein described. Note, however, what is said therein does not apply to the admixture with other conventional demulsifiers. The herein described demulsifiers are indeed primarily for use as such without further formulation.

It has been previously pointed out that the effectiveness of the herein described demulsifier is its ability to break oil field emulsions under conventional conditions without sludge and at the same time yielding bright pipeline oil, i. e., pipe line oil that is free from the minute traces of foreign matter whether suspended water or suspended emulsion droplets, are due to non resolvable solids as described hereinafter.

In examining the results in the above table there are two things which are particularly striking. One is the fact that in many instances an emulsion can be treated with a nonionic demulsifier at a ratio of, for example, 1 to 15,000. The demulsifier may leave a trace of suspended matter in the oil and also permit a small amount of sludge at the interface. By usual criteria neither factor is objectionable provided that (a) the upper oil layer meets pipeline requirements notwithstanding a mere haze, and the second (b) that the amount of sludge formed is slight and requires being drawn off once or twice a month from a second gun barrel, stock tank or the like. The amount of oil so discarded is insignificant either from the standpoint of the value of the oil or stream contamination.

However, whether justified or not it is frequently the practice to use a demulsifier that produces absolutely bright haze-free oil in the top layer and yields no interface layer at any time and not even over a period of time in the stock tank.

In such cases merely increasing the amount of nonionic demulsifier from 1 part to 15,000 emulsion to 1 part to 12,000 for example frequently causes no change in respect to either the haze, or interface sludge, or both.

However, if an admixture is made as previously described, and the mixture used, then one obtains haze-free oil without an interface layer. In such instances frequently it will be found that the amount of such demulsifier is substantially the same as would be required in absence of the ammonium sulfonate, to give a conventionally acceptable resolution. Stated another way, the ammonium sulfonate in the admixture appears to contribute little or nothing as far as any demulsifying action in the usual sense of the word, but does either by itself or by synergistic combination result in the haze-free, sludge-free emulsion resolution.

What has been said immediately preceding may appear inconsistent in light of what was said in regard to U. S. Patent 1,299,385, dated April 1, 1919, to Rogers. At the time of the issuance of the Rogers patent a ratio of 1 to 1,000 to 1 to 2,000 was considered excellent. Total foreign matter acceptable in pipeline oil at that time ran from 1 to 3% and as a matter of fact a sludge layer or interface layer was taken for granted in many instances.

A slight sludge layer or interface layer is illustrated for example in a drawing which is part of the U. S. Patent 1,223,659, dated April 24, 1917, to Barnickel.

In light of what has been said previously no attempt is made to explain the effect obtained by the added anionic ammonium sulfonate. In some instances the haze in the upper layer pipeline oil and the sludge of the interface is not a refractory emulsion. As has been stated previously in the resolution of petroleum emulsion one some times obtains a sludge in the interface. This sludge may be of two different types or, for that matter, a mixture of two. One type is non-resolvable sludge. It consists of exceedingly fine iron oxide or sulfide or other insolubles. Furthermore, the insolubles may be organic in nature such as, waxes, paraffins, asphaltenes or the like. This type of sludge in essence is not the refractory emulsion of the water-in-oil type which has resisted demulsification. The other type of sludge is simply a more resistant or refractory sludge which apparently has been immune to demulsification in the usual operation. Sometimes either type of sludge or both separate out in tanks and become "tank bottoms."

We have satisfied ourselves, that in some instances and, perhaps in the majority of instances, the added anionic ammonium sulfonate does not act as a demulsifier but merely acts as a dispersant or a deflocculating agent for non-emulsified insolubles as noted above. In other words the trace of impurity that would appear at the interface and the trace of haze that appeared in the upper layer when the nonionic demulsifier was used alone simply was dispersed in a much finer state by virtue of the presence of the anionic ammonium sulfonate and thus bright oil without a sludge layer was obtained and the upper layer still would meet pipeline requirements for the presence of foreign matter.

Having thus described our invention what we claim as new and desire to secure by Letters Patent is:

1. A process for breaking petroleum emulsions of the water-in-oil type characterized by subjecting the emulsion to the action of a demulsifying agent; said demulsifying agent being a mixture of at least 60% by weight and not over 90% by weight of (A) an aromatic solvent-soluble nonionic demulsifier, containing a plurality of lower oxyalkylene groups and at least 10% by weight and not over 40% by weight of (B) ammonium salts obtained by mono sulfonation and neutralization of a sulphonatable mixture; said sulphonatable mixture consisting of (a) nonyl phenol foots; said foots being characterized by a dinonyl phenol to nonyl phenol ratio within the range of 2:1 to 3:1 and with the proviso that said nonyl phenol foots contain not less than 90% of nonylated phenols and (b) keryl benzene foots consisting essentially of dikeryl benzene and other polykeryl benzenes; the ratio of (a) to (b) being within the range of 2:1 to 4:1.

2. The process of claim 1 with the proviso that the nonionic demulsifying agent be obtained by use of at least one olefin oxide selected from the class consisting of ethylene oxide, propylene oxide and butylene oxide.

3. The process of claim 1 with the proviso that the nonionic demulsifier be obtained by the use of ethylene oxide in combination with propylene oxide.

4. A process for breaking petroleum emulsions of the water-in-oil type characterized by subjecting the emulsion to the action of a demulsifier. Said demulsifier being obtained by a mixture of at least 60% by weight and not over 90% by weight of (A) an aromatic solvent-soluble nonionic demulsifier containing a plurality of lower oxyalkylene groups; said demulsifier being obtained by the use of propylene oxide and ethylene oxide exclusively with the proviso that not less than 25% by weight of the alkylene oxide reactant be propylene oxide, and at least 10% by weight and not over 40% by weight of (B) ammonium salts obtained by mono sulfonation and neutralization of a sulphonatable mixture; said sulphonatable mixture consisting of (a) nonyl phenol foots; said foots being characterized by a dinonyl phenol to nonyl phenol ratio within the range of 2:1 to 3:1 and with the proviso that said nonyl phenol foots contain not less than 90% of nonylated phenols and (b) keryl benzene foots consisting essentially of dikeryl benzene and other polykeryl benzenes; the ratio of (a) to (b) being within the range of 2:1 to 4:1.

5. The process of claim 4 with the proviso that the ratios of the two components, (A) and (B), be roughly 90 parts by weights and 10 parts by weight; the latter being the ammonium sulfonate.

6. The process of claim 4 with the proviso that the ratios of the two components, (A) and (B), be roughly 80 parts by weight and 20 parts by weight; the latter being the ammonium sulfonate.

7. The process of claim 4 with the proviso that the ratios of the two components, (A) and (B), be roughly 75 parts by weight and 25 parts by weight; the latter being the ammonium sulfonate.

8. The process of claim 4 with the proviso that the ratios of the two components, (A) and (B), be roughly 66.7 parts by weight and 33.3 parts by weight; the latter being the ammonium sulfonate.

9. The process of claim 4 with the proviso that the ratios of the two components, (A) and (B), be roughly 60 parts by weight and 40 parts by weight; the latter being the ammonium sulfonate.

10. A process for breaking petroleum emulsions of the water-in-oil type characterized by subjecting the emulsion to the action of a demulsifying agent; said demulsifying agent being a mixture of at least 60% by weight and not over 90% by weight of (A) an aromatic solvent-soluble nonionic demulsifier, containing a plurality of lower oxyalkylene groups and at least 10% by weight and not over 40% by weight of (B) ammonium salts obtained by mono sulfonation and neutralization of a sulphonatable mixture; said sulphonatable mixture consisting of (a) nonyl phenol foots; said foots being characterized by a dinonyl phenol to nonyl phenol ratio within the range of 2:1 to 3:1 and with the proviso that said nonyl phenol foots contain not less than 90% of nonylated phenols and (b) keryl benzene foots consisting essentially of dikeryl benzene and other polykeryl benzenes; the ratio of (a) to (b) being within the range of 2:1 to 4:1; said emulsion resolution being characterized by a substantially bright upper phase and a sludge-free interface.

11. The process of claim 10 with the proviso that the nonionic demulsifying agent be obtained by use of at least one olefin oxide selected from the class consisting of ethylene oxide, propylene oxide and butylene oxide.

12. The process of claim 10 with the proviso that the nonionic demulsifier be obtained by the use of ethylene oxide in combination with propylene oxide.

13. A process for breaking petroleum emulsions of the water-in-oil type characterized by subjecting the emulsion to the action of a demulsifier. Said demulsifier being obtained by a mixture of at least 60% by weight and not over 90% by weight of (A) an aromatic solvent-soluble nonionic demulsifier containing a plurality of lower oxyalkylene groups; said demulsifier being obtained by the use of propylene oxide and ethylene oxide exclusively with the proviso that not less than 25% by weight of the alkylene oxide reactant be propylene oxide, and at least 10% by weight and not over 40% by weight of (B) ammonium salts obtained by mono sulphonation and neutralization of a sulphonatable mixture; said sulphonatable mixture consisting of (a) nonyl phenol foots; said foots being characterized by a dinonyl phenol to nonyl phenol ratio within the range of 2:1 to 3:1 and with the proviso that said nonyl phenol foots contain not less than 90% of nonylated phenols and (b) keryl benzene foots consisting essentially of dikeryl benzene and other polykeryl benzenes; the ratio of (a) to (b) being within the range of 2:1 to 4:1; said emulsion resolution being characterized by a substantially bright upper phase and a sludge-free interface.

14. The process of claim 13 with the proviso that the ratios of the two components, (A) and (B), be roughly 90 parts by weight and 10 parts by weight; the latter being the ammonium sulfonate.

15. The process of claim 13 with the proviso that the ratios of the two components, (A) and (B), be roughly 80 parts by weight and 20 parts by weight; the latter being the ammonium sulfonate.

16. The process of claim 13 with the proviso that the ratios of the two components, (A) and (B), be roughly 75 parts by weight and 25 parts by weight; the latter being the ammonium sulfonate.

17. The process of claim 13 with the proviso that the ratios of the two components, (A) and (B), be roughly 66.7 parts by weight and 33.3 parts by weight; the latter being the ammonium sulfonate.

18. The process of claim 13 with the proviso that the ratios of the two components, (A) and (B), be roughly 60 parts by weight and 40 parts by weight; the latter being the ammonium sulfonate.

19. A process for breaking petroleum emulsions of the water-in-oil type characterized by subjecting the emulsion to the action of a demulsifying agent; said demulsifying agent being a mixture of at least 60% by weight and not over 90% by weight of (A) an aromatic solvent-soluble nonionic demulsifier, containing a plurality of lower oxyalkylene groups and at least 10% by weight and not over 40% by weight of (B) ammonium salts obtained by mono sulphonation and neutralization of a sulphonatable mixture; said sulphonatable mixture consisting of (a) nonyl phenol foots; said foots being characterized by a dinonyl phenol to nonyl phenol ratio within the range of 2:1 to 3:1 and with the proviso that said nonyl phenol foots contain not less than 90% of nonylated phenols and (b) keryl benzene foots consisting essentially of dikeryl benzene and other polykeryl benzenes; the ratio of (a) to (b) being within the range of 2:1 to 4:1; said emulsion resolution being characterized by a substantially bright upper phase and a sludge-free interface; and with the further proviso that the amount of demulsifier used is sufficient that the aromatic solvent soluble nonionic demulsifier in the absence of the ammonium sulfonate would cause the emulsion to break.

20. The process of claim 19 with the proviso that the nonionic demulsifying agent be obtained by use of at least one olefin oxide selected from the class consisting of ethylene oxide, propylene oxide and butylene oxide.

21. The process of claim 19 with the proviso that the nonionic demulsifier be obtained by the use of ethylene oxide in combination with propylene oxide.

22. A process for breaking petroleum emulsions of the water-in-oil type characterized by subjecting the emulsion to the action of a demulsifier. Said demulsifier being obtained by a mixture of at least 60% by weight and not over 90% by weight of (A) an aromatic solvent-soluble nonionic demulsifier containing a plurality of lower oxyalkylene groups; said demulsifier being obtained by the use of propylene oxide and ethylene oxide exclusively with the proviso that not less than 25% by weight of the alkylene oxide reactant be propylene oxide, and at least 10% by weight and not over 40% by weight of (B) ammonium salts obtained by mono sulphonation and neutralization of a sulphonatable mixture; said sulphonatable mixture consisting of (a) nonyl phenol foots; said foots being characterized by a dinonyl phenol to nonyl phenol ratio within the range of 2:1 to 3:1 and with the proviso that said nonyl phenol foots contain not less than 90% of nonylated phenols and (b) keryl benzene foots consisting essentially of dikeryl benzene and other polykeryl benzenes; the ratio of (a) to (b) being within the range of 2:1 to 4:1; said emulsion resolution being characterized by a substantially bright upper phase and a sludge-free interface; and with the further proviso that the amount of demulsifier used is sufficient that the aromatic solvent soluble nonionic demulsifier in the absence of the ammonium sulfonate would cause the emulsion to break.

23. The process of claim 22 with the proviso that the ratios of the two components, (A) and (B), be roughly 90 parts by weight and 10 parts by weight; the latter being the ammonium sulfonate.

24. The process of claim 22 with the proviso that the ratios of the two components, (A) and (B), be roughly 80 parts by weight and 20 parts by weight; the latter being the ammonium sulfonate.

25. The process of claim 22 with the proviso that the ratios of the two components, (A) and (B), be roughly 75 parts by weight and 25 parts by weight; the latter being the ammonium sulfonate.

26. The process of claim 22 with the proviso that the ratios of the two components, (A) and (B), be roughly 66.7 parts by weight and 33.3 parts by weight; the latter being the ammonium sulfonate.

27. The process of claim 22 with the proviso that the ratios of the two components, (A) and (B), be roughly 60 parts by weight and 40 parts by weight; the latter being the ammonium sulfonate.

References Cited in the file of this patent

UNITED STATES PATENTS

| | | |
|---|---|---|
| 2,249,757 | Flett | July 22, 1941 |
| 2,448,684 | Petrino | Sept. 7, 1948 |
| 2,568,116 | De Groote et al. | Sept. 18, 1951 |
| 2,602,052 | De Groote | July 1, 1952 |
| 2,671,762 | Wisherd | Mar. 9, 1954 |